United States Patent [19]
Milovancevic

[11] 3,821,627
[45] June 28, 1974

[54] D-C VOLTAGE MULTIPLIERS AND POLARITY CONVERTERS

[76] Inventor: Slavko Milovancevic, P.O. Box 402, Torrance, Calif. 90508

[22] Filed: July 26, 1971

[21] Appl. No.: 166,108

[52] U.S. Cl............ 321/2, 321/10, 321/15, 307/110
[51] Int. Cl........... H02m 1/08, H02m 3/14
[58] Field of Search.......... 321/2, 15, 8, 10, 16, 47; 307/110

[56] References Cited
UNITED STATES PATENTS

| | | |
|---|---|---|
| 2,332,536 | 10/1943 | Schlegel............ 321/10 X |
| 2,342,628 | 2/1944 | Evjen et al.......... 321/47 X |
| 2,924,769 | 2/1960 | Harriman et al..... 321/16 X |
| 3,002,114 | 9/1961 | Englund............ 307/110 |
| 3,432,738 | 3/1969 | Jensen............. 321/15 |
| 3,478,258 | 11/1969 | Nagai.............. 321/15 |

FOREIGN PATENTS OR APPLICATIONS
961,819  4/1957  Germany............ 321/16

OTHER PUBLICATIONS
Electronics, "DC to DC Converter Offers Positive or Negative Bias", p. 95, May 25, 1970.
Electronics, "Capactitors Add Up in Voltage Multiplier", p. 104, Mar. 2, 1070.

Primary Examiner—Gerald Goldberg

[57] ABSTRACT

Circuits to perform voltage multiplication and polarity conversion function using diodes and capacitors, driven by a voltage sensing and/or an amplifier stage, for rectified non-filtered sine wave voltage as input.

Circuits to perform voltage multiplication and polarity conversion function using diodes and capacitors driven by an astable multivibrator for battery or rectified, filtered a-c voltage as input voltage.

6 Claims, 28 Drawing Figures

PATENTED JUN 28 1974

INVENTOR.

Slavko Milovančević
(SLAVKO MILOVANCEVIC)

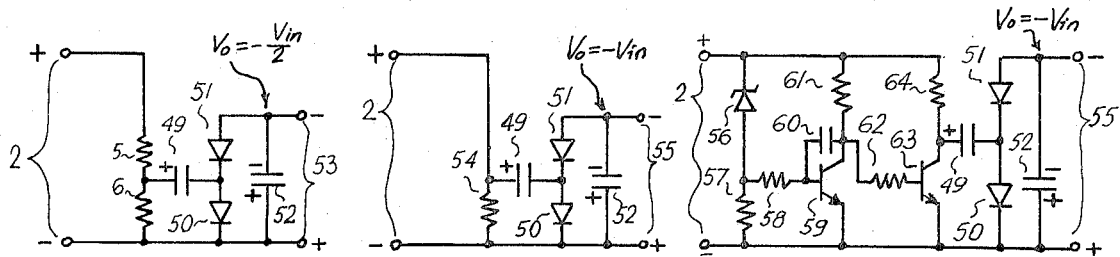
Fig. 11.  Fig. 12.  Fig. 13.
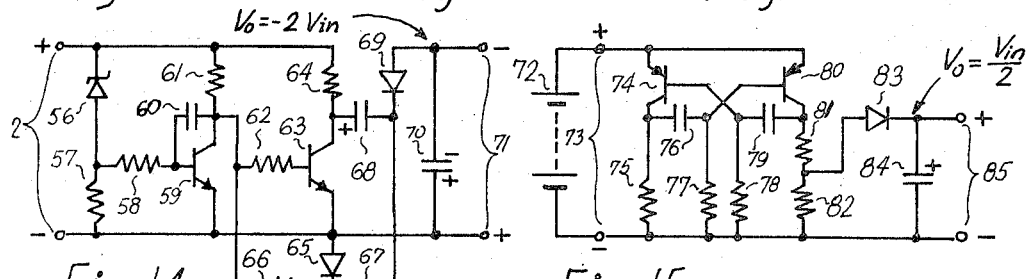
Fig. 14.  Fig. 15.
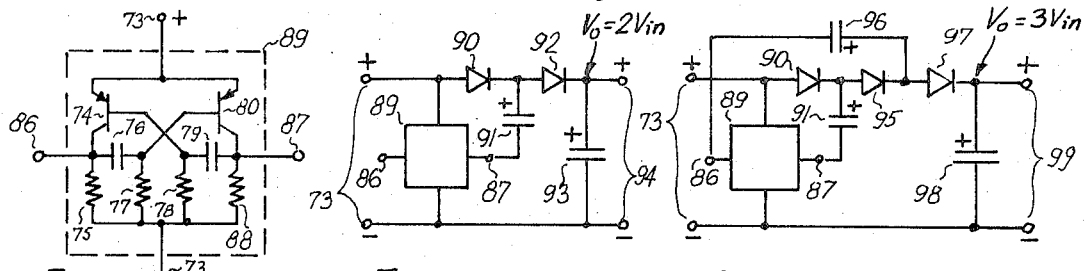
Fig. 16.  Fig. 17.  Fig. 18.
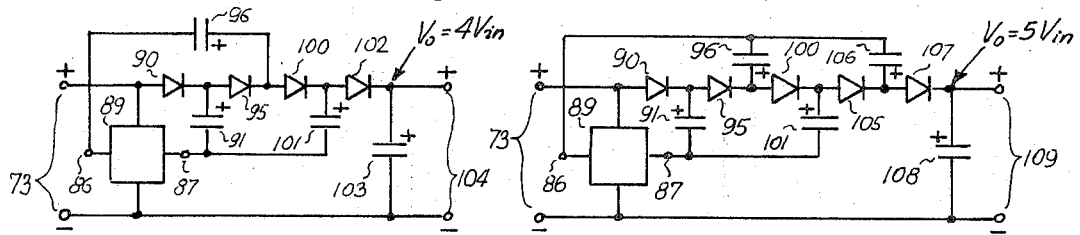
Fig. 19.  Fig. 20.
INVENTOR.
(SLAVKO MILOVANCEVIC)

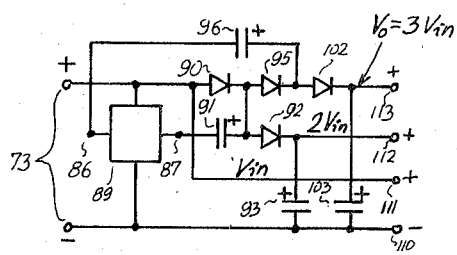
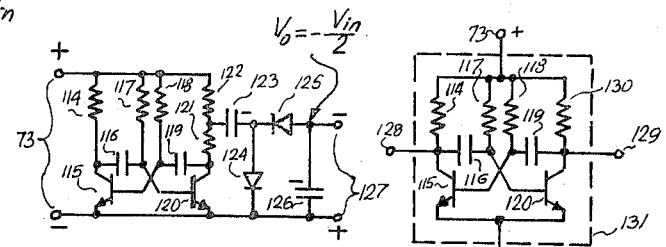
Fig.21.    Fig.22.    Fig.23.
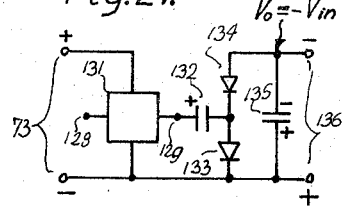
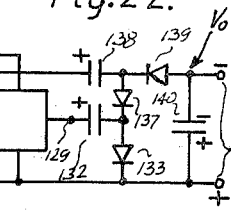
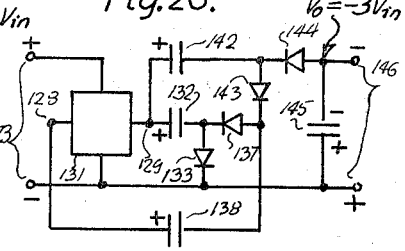
Fig.24.    Fig.25.    Fig.26.
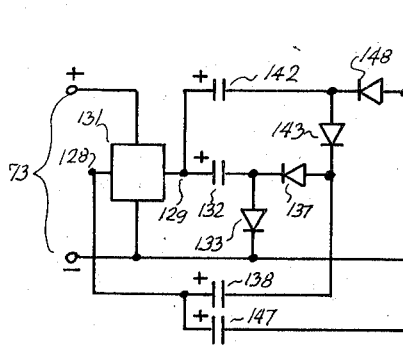
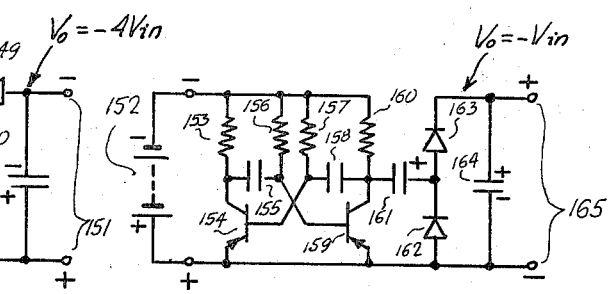
Fig.27    Fig.28.
INVENTOR.
Slavko Milovančević
(SLAVKO MILOVANCEVIC)

D-C VOLTAGE MULTIPLIERS AND POLARITY CONVERTERS

BACKGROUND OF THE INVENTION

Field of the invention

The present invention relates generally to electric power conversion circuits, particularly to those using electronic means for voltage multiplication and/or polarity conversion as applied to the D-C voltage. One way of achieving this is by charging capacitors to the supply voltage or its multiples, superimpose them to the supply voltage and discharge into a storage capacitor to form double, triple, quadruple, quintuple or any integer or fraction of it.

Conventionally this function is performed by a D-C converter with the step-up transformer, rectifier and filter or as in U.S. Pat. No. 3,432,738 by use of a feedback transformer and two transistors to drive a set of capacitors and rectifiers, and form multiples of the supply voltage.

The specific improvement of the present invention is in absence of inductive components, multiplication and polarity conversion of a rectified unfiltered sine wave including a certain degree of voltage regulation, novel arrangement of capacitors and diodes to form triple and higher multiples of the input voltage, solution to the multiples which are fraction of 1 etc.

These features are useful where a positive or negative, elevated or reduced voltage is required (especially at relatively low currents), where RF noise should be low with little or no filtering at all, where both noise and the ripple should be low particularly at the multiples of the input voltage. Another particularity of these circuits is their ability to operate at high frequencies (even in megacycles) requiring only small capacitors resulting in small overall size and possible integration.

Circuits given in this application cover these possibilities: voltage multiplication, with output voltage larger or smaller than the supply voltage, with the same or with opposite polarity to the supply voltage at the output terminals, for positive or negative battery or rectified and filtered a-c voltage, and for positive or negative rectified non-filtered sine wave as the input voltage. Many more modifications and variations are possible and apparent to those skilled in the art, all based on this invention. In preparing for the patent application over 50 different circuits have been built and successfully tested. Further application possibilities and other features will become more apparent to those skilled in the art upon examination of specification, claims and drawings.

DESCRIPTION OF THE DRAWINGS

There are two groups of drawings: First one (FIGS. 1 - 14) pertains to circuits supplied by rectified non-filtered sine wave voltage, the second one (FIGS. 15 - 28) pertains to the circuits supplied by a battery or rectified filtered a-c voltage. Circuits in each group perform similar functions in most cases. Said figures represent as follows:

FIG. 11 illustrates a polarity converter-voltage scaler

FIG. 12 illustrates a polarity converter

FIG. 13 illustrates a version of a polarity converter

FIG. 14 illustrates a polarity converter-voltage doubler

FIG. 15 illustrates a voltage scaler for battery type voltage

FIG. 16 conventional astable multivibrator used as a switch

FIG. 17 illustrates a voltage doubler

FIG. 18 illustrates a voltage tripler

FIG. 19 illustrates a voltage quadrupler

FIG. 20 illustrates a voltage quintupler

FIG. 21 illustrates a multiple output voltage multiplier

FIG. 22 illustrates a polarity converter-voltage scaler

FIG. 23 illustrates complement to circuit in FIG. 16.

FIG. 24 illustrates a polarity converter

FIG. 25 illustrates a polarity converter-voltage doubler

FIG. 26 illustrates a polarity converter-voltage tripler

FIG. 27 illustrates a polarity converter-voltage quadrupler

FIG. 28 illustrates a complement to circuit in FIG. 24.

DETAILED DESCRIPTION OF OPERATION

To present essentials of the invention it will suffice to describe in detail only few representative circuits. Hints on operation of others also will be given. All these circuits are listed to give a fairly complete picture in d-c voltage multiplication and polarity conversion.

Figure 1:
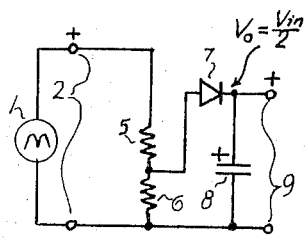
FIG. 1 is a circuit diagram of the supply voltage scaler

Referring to FIG. 1, d-c voltage multipliers and polarity converters, of the present invention, includes: a voltage source of rectified non-filtered sine wave designated 1, a pair of input terminals designated 2, two in series connected resistors, forming a voltage divider designated 5 and 6 respectively, a junction diode designated 7 used as a blocking diode, a storage capacitor designated 8 connected across output terminals designated 9. When a rectified non-filtered sine wave voltage is delivered to the input terminals designated 2, it is impressed at the same time across resistors 5 and 6. Since capacitor 8 has not been charged diode 7 is conductive allowing charging of capacitor 8 to a voltage defined by resistors 5 and 6 and the amplitude of the input voltage. If resistors 5 and 6 have same value capacitor 8 is charged to a voltage equal to $\frac{1}{2}V_{in}$. Once input voltage reaches its peak, voltage across capacitor 8 is at its maximum under given conditions. When input voltage starts of diode 7 sees a voltage decreasing below voltage at capacitor 8, diode becomes nonconductive. Discharge time constant formed by capacitor 8 and load across terminals 9 is assumed much longer than alteration (half period) of rectified non-filtered sine wave, as normally is. Thus, capacitor can not discharge through diode 7 and resistors 5 and 6 except for leakage current which is in all cases a negligible amount and the voltage across terminals 9, thus across the load, will remain near the maximum possible value. Decrease of the voltage across capacitor 8 due to load current will be compensated during next alteration while input voltage is at the peak. It is obvious that any ratio of resistors 5 and 6 can be used to provide a voltage across terminals 9 from 0 volts to approximately $V_{in\ peak}$. If an adjustable output voltage is desirable a potentiometer can be used in place of resistors 5 and 6.

Figure 2:
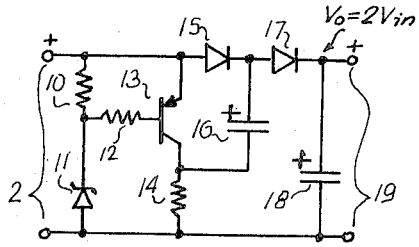
FIG. 2 illustrates a simple voltage doubler circuit
Figure 3:
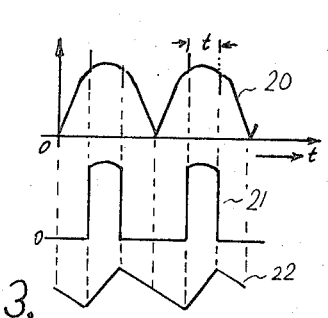
FIG. 3 illustrates voltage waveforms for circuit in FIG. 2

FIGS. 2 and 3 of the present invention include: input terminals designated 2, output terminals designated 19, Zener diode current limiting resistor designated 10, Zener diode as reference voltage source 11, base current limiting resistor designated 12, a p-n-p type transistor designated 13, its collector resistor designated 14, first diode designated 15, charge transfer capacitor designated 16, second diode designated 17 and a storage capacitor designated 18. Input waveform is a time function, for example, as indicated by 20 in FIG. 3. Corresponding voltage across resistor 14, common point for diodes 15 and 17 and the collector current of transistor 13 have waveform like 21 in FIG. 3. Finally, voltage across storage capacitor 18 and the load across terminals 19 have the fluctuations as indicated by 22 in FIG. 3.

Interconnection of mentioned components is as follows. To the input "+" terminal are connected: resistor 10, diode 15 and emitter of transistor 13. The remaining end of resistor 10 is connected to the cathode of Zener diode 11 and the base current limiting resistor 12. Anode of diode 11 is connected to the "−" terminal and so is the resistor 14 whose other end is connected to the collector of transistor 13 and to one plate of capacitor 16. The remaining end of resistor 12 is connected to the base of transistor 13, while cathode of diode 15 is connected to the other plate of capacitor 16 and anode of diode 17. Finally, the "+" cathode of diode 17 is connected to the + output terminal and one plate of the storage capacitor 18 whose remaining plate is connected to the common − terminal.

This is a voltage doubler that operates in the following manner. Assume that circuit had no power applied before, capacitors are not charged. Next instant a positive going pulse 20, is present across input terminals 2. Since Zener diode 11 has breakdown (Zener)-voltage nearly equal to the peak input voltage 20, it will not conduct, transistor 13 will remain in non-conductive state. Capacitor 16 will be charged through diode 15 and resistor 14, so will capacitor 18 through diodes 15 and 17, both will follow the rise in input voltage till it approaches Zener voltage. Capacitor 16 will be charged to a voltage approximately equal to Zener voltage, capacitor 18 to same voltage less a diode voltage drop. The instant input voltage equals the Zener voltage, 11 starts conducting and its current develops a voltage drop across resistor 10. Input voltage rises further, current through Zener diode increases, so does voltage drop across resistor 10, base emitter junction of transistor 13 and voltage across capacitors 16 and 18. Next instant voltage drop across resistor 10, due to Zener diode current, equals the sum of the voltage drop across resistor 12 and the base emitter junction voltage of transistor 13 needed for conduction of the same, will make transistor 13 conductive, collector to emitter voltage starts decreasing, diode 15 becomes non-conductive. Since capacitor 16 has been charged to a voltage approximately equal to Zener diode voltage and since its negative plate is being pulled toward emitter i.e. input voltage, diode 17 and capacitor 18 see input voltage plus voltage difference of magnitude equal to voltage across capacitor 16 less the voltage across emitter collector path of transistor 13. The moment the transistor 13 enters saturation, which happens very soon, voltage across capacitor 16 is, practically speaking, aded up to the input voltage which keeps diode 17 conductive and capacitor 18 still being charged till it reaches a voltage equal to the input voltage magnitude plus one-half the Zener voltage, if capacitors 16 and 18 are of same capacity. As input voltage passes its maximum and drops to approximately Zener voltage, transistor 13 stops conducting, collector electrode voltage is zero toward − terminal, capacitor 16 sees again an input voltage equal to Zener voltage and recharges through diode 15 and resistor 14 to approximately same value, while at the same time diode 17 sees a smaller positive voltage at its anode, thus it is non-conductive. Load across output terminals 19 has been receiving a current from capacitor 18 as soon as voltage buildup across it rose over 0 volts. From now on input voltage decreases more and more so that diode 15 sees a smaller positive voltage on its anode than on its cathode, thus it is nonconductive so that capacitor 16 keeps its charge untouched since diode 17 is also nonconductive. Input voltage decreases and reaches 0 volts, capacitor 16 is charged to the voltage equal to Zener voltage, capacitor 18 voltage is slowly decreasing as the load across output draws the current from it. With the start of next alteration input voltage starts rising again, but Zener diode 11 and the transistor 13 remain nonconductive until input voltage reaches a voltage equal to Zener voltage plus voltage of the base emitter junction of transistor 13 plus the voltage drop across resistor 12, due to base current of transistor 13, when voltage across capacitor 16 will be added up to the input voltage and will discharge into capacitor 18, bringing its voltage closer to the double input voltage magnitude. This discharge of capacitor 16 into 18 is marked by a positive going pulse at the beginning of interval $t$ was indicted by 20 in FIG. 3. During interval $t$ transistor 13 and Zener diode 11 remain conductive, capacitor 16, at the same time, contributes to the load current until the moment when transistor 13 and diode 11 stop conducting allowing capacitor 16 to be recharged at the end of interval $t$ as indicated by the negative going pulse on waveform 20 in FIG. 3. This process is repeated again and again so that maximum possible voltage across capacitor 18 equals: maximum input voltage less a voltage drop across a diode, plus the Zener diode voltage. Note now that even if the magnitude of the input voltage varies for any reason Zener voltage remains unchanged, except for temperature effects, so that output voltage does not vary with a double change of input voltage, but rather with a single change. This means a partial voltage regulation of the output voltage. Energy from the input is taken only during interval $t$, which becomes shorter when output voltage reaches its maximum under given conditions.

Since diodes 15 and 17 'block' capacitor 16 and 18 discharge toward input they are called 'blocking' diodes, since capacitor 16 transfers charge from input to the storage capacitor 18 it is called 'charge transfer capacitor'. Capacitor 18 is named properly: storage capacitor, as known in the art.

Figure 4:
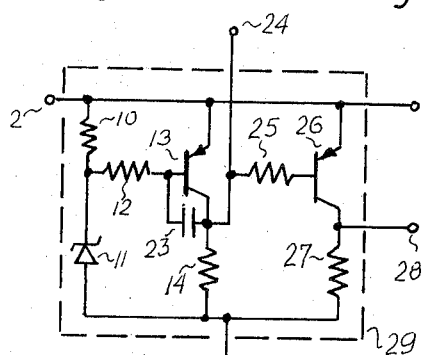
FIG. 4 illustrates voltage sensing and switching circuit
Figure 5:
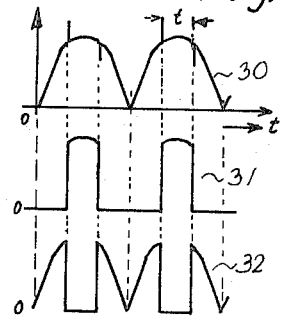
FIG. 5 illustrates the voltage waveforms for circuit in FIG. 4

FIG. 4 and FIG. 5. Referring to FIG. 4 components designated 2,10,11,12, 13 and 14 are the same as in FIG. 2. In addition a small capacitor designated 23 is connected from collector to the base of transistor 13 providing negative feedback at high frequencies and preventing selfoscillation and multiple switching. Another stage is added, to the first one, consisting of resistors designated 25 and 27, a transistor designated 26, terminal from the first collector designated 24, terminal from the second collector designated 28, input terminals designated 2 as before, and output terminals designated 19. Since this circuit is used repeatedly it has been designated as block 29. This circuit is actually a double switch in which transistor 26 is conductive most of the time, and it is not conductive when input voltage crosses zero and near the peak when trasistor 13 conducts as explained for FIG. 2. This is true since resistor 25 is connected to the collector of transistor 13. When transistor 13 conducts it enters saturation collector to emitter voltage drop is to small to keep the transistor 26 in conductive state. Consequently voltage drop across collector resistor 27 is zero during time interval $t$. As opposed to its voltage drop across resistor 14 is at nearly peak voltage during time interval $t$. Referring to FIG. 5: waveform designated 30 is that of input voltage, 31 voltage waveform across resistor 14 (also current through transistor 13), while 32 voltage waveform across resistor 27 (also current through transistor 26).

Figure 6:
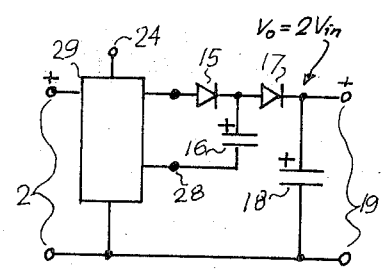
FIG. 6 illustates a voltage doubler

Referring to FIG. 6. If to FIG. 4 is added a set blocking diode - charge transfer capacitor, and a set blocking diode - storage capacitor a voltage doubler of FIG.6 results. Since operation of FIG. 2 was in detail explained it is not necessary to do same for FIG. 6 In short circuit in FIG. 6 operates as follows: assume that capacitor 18 is already charged to or near the double peak input voltage. Capacitor 16 is assumed charged to near the peak input voltage. At the considered instant assume input voltage rising from zero towards its peak. Transistor 26 is soon in saturation, then negative plate of capacitor 16 follows the input voltage rise, so does it its positive plate, when the sum input voltage plus voltage across capacitor 16 equals approximately double input peak voltage capacitor 16 will discharge into storage capacitor 18. Soon after transistor 13 starts conducting, transistor 26 stops conducting allowing capacitor 16 to be charged to near the peak input voltage. As input voltage drops sufficiently, transistor 13 stops conducting, transistor 26 is again biased through resistors 14 and 25 into conduction allowing another discharge of capacitor 16 into capacitor 18 (under heavy load conditions) and soon recharge just at the end of time interval $t$. This results in better load handling capability.

Figure 7:
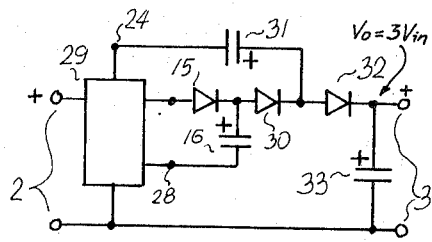
FIG. 7 illustrates a voltage tripler

FIG. 7 is a modified FIG. 6 where a new set blocking diode (designated 30 and charge transfer capacitor (designated 31) is added. Instead of blocking diode 17 we have 32, and instead of storage capacitor 18 we have capacitor 33. Output terminals are now designated 34. These new numbers are assigned since new elements must have different ratings from those in FIG. 6. Since operation is very similar to that of the doubler in FIG. 6 a brief operation of the tripler in FIG. 7 is: capacitor 16 is charged to peak input voltage during time interval $t$, when superimposed to the input voltage (transistor 26 conductive) capacitor 31 is charged to double peak input voltage. When transistor 13 is conductive (during time interval $t$) double peak input voltage across capacitor 31 is superimposed to input peak voltage forming a triple input peak voltage and charging storage capacitor 33 to triple input peak voltage. Thus, supply recharges 16, capacitor 16 recharges capacitor 31, which recharges storage capacitor 33 to supply the load with approximately triple peak input voltage.

Figure 8:
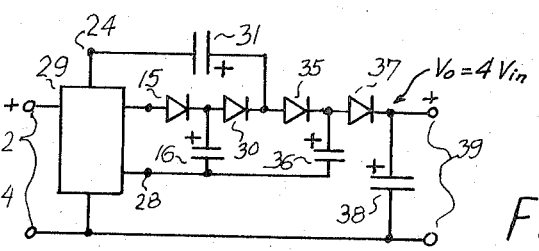
FIG. 8 illustrates a voltage quadrupler

In FIG. 8 we have a voltage quadrupler. Electric energy transfer follows the route: capacitor 16 is charged to peak input voltage from the supply, then added to it to charge capacitor 31 to double peak input voltage, which added to supply voltage forms triple peak input voltage charging capacitor 36. This is once more added to the supply voltage forming a quadruple input peak voltage and stored in the storage capacitor 38. Note necessary sequence in capacitor charge and discharge: 16 - 31 - 36 - 38. This sequence is repeated during each alteration.

Figure 9:
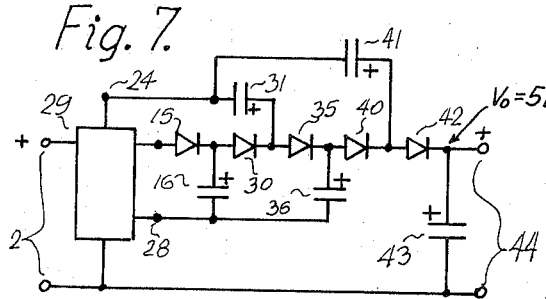
FIG. 9 illustrates a voltage quintupler

FIG. 9 represents a quintupler. Operation is quite similar to one just described and needs no additional explanation.

Figure 10:
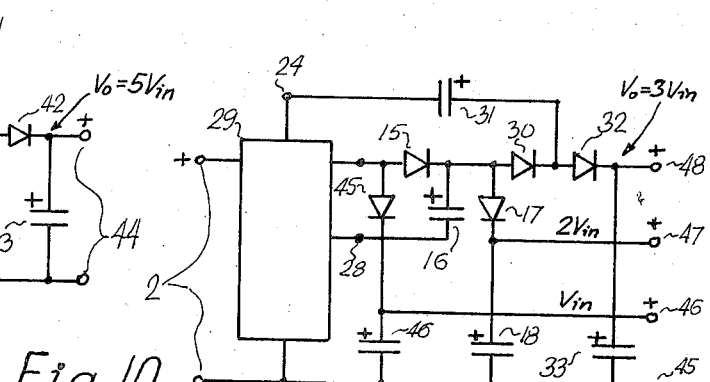
FIG. 10 illustrates a multiple output voltage multiplier

FIG. 10 is a multiple output multiplier. Here blocking diode 45 supplies the first storage capacitor 46 with peak input voltage, blocking diode 17 supplies the storage capacitor 18 with double input peak voltage, and finally blocking diode 32 supplies the third storage capacitor 33 with triple peak input voltage. Similar arrangement can be done on quadruplers, quintuplers etc.

FIG. 11 represents a voltage scaler and polarity converter. Here like in FIG. 1 resistors 5 and 6 define to which fraction of the peak input voltage charge transfer capacitor will be charged through blocking diode 50. Once input voltage drops to zero full voltage on capacitor 49 is impressed across diode 51 and storage capacitor 52. Positive plate of 49 is at zero potential, thus negative potential will appear across output − terminal.

FIG. 12 is a special case of FIG. 11 when resistor 5 assumes value zero. Operation is same as for FIG. 11. Resistor designated 54 has purpose to connect positive plate of capacitor 49 to − terminal when input voltage drops to zero. Output terminals are now designated 55 since output voltage is different (generally higher) from the one in FIG. 11.

FIG. 13 represents an improved polarity converter having new circuit elements designated 56 − 64. Knowing operation of circuits in FIG. 4 and in FIG. 12 it will be easily understood how capacitor 49 will charge storage capacitor 52 during each alteration in FIG. 13, and how polarity reversal occurs.

FIG. 14 represents a polarity converter-voltage doubler. Voltage doubling is achieved due to the fact that charged capacitor 66 is connected to the − terminal 2, once during each alteration pushing the negative plate of capacitor 68 to a potential equal to the peak input voltage, bellow the potential of − terminal 2, causing capacitor 68 to be charged to double peak input voltage. At the end of interval $t$ transistor 59 stops conducting, transistor 63 starts conducting and enters saturation connecting positive plate of capacitor 68 to the − terminal 2 and charging storage capacitor 70 to double peak input voltage of opposite polarity to the supply voltage.

Tripler, and quadrupler polarity converter has been built. More multiplication and more elaborate circuits with better efficiency have been built.

So far we have considered circuits for rectified unfiltered sine wave as the input (supply) voltage. Circuits will operate also on any other pulsating D-C voltage which periodically drops to zero volts. This is a requirement to be satisfied if capacitors are to be charged to peak input voltage and efficient multiplication and polarity conversion to be achieved.

Circuits that follow FIGS. 15 – 28) are supplied with the battery or rectified filter a-c voltage. In order to charge capacitors to the supply voltage and to superimpose it to the supply voltage, and in order to achieve the multiplication and/or polarity conversion, switches must be used. Just like before one capacitor plate must be once connected to the zero potential input terminal, in order to charge capacitor to the supply voltage, and next to be connected to full input voltage (while other plate is isolated from it at the same time) forming multiple of the input voltage and charging a storage capacitor. This switching can be achieved by use of any form of switch that can do it efficiently, here an astable multivibrator was used as a known type of electronic switch.

Referring now to FIG. 15 representing a voltage scaler and including: a battery generally designated 72, input terminals designated 73, first p-n-p type transistor designated 74, its collector resistor designated 75, capacitor connected to interconnection of 74 and 75 and designated 76, first biasing resistor designated 77, second biasing resistor designated 78, second capacitor designated 79, second p-n-p type transistor designated 80, a voltage divider in its collector consisting of resistors designated 81 and 82, a blocking diode designated 83, a storage capacitor designated 84 and output terminals designated 85. Elements designated 74 – 82 form a conventional astable multivibrator, its operation is well known in the art. When transistor 80 conducts diode 83 is forward biased by the voltage defined by resistors 81 and 82, capacitor 84 is charged to approximately same voltage. When transistor 80 becomes nonconductive anode of diode 83 is at the − terminal potential i.e. zero volts, its cathode at a positive potential across capacitor 84, diode 83 is therefore nonconductive. Thus capacitor 84 is recharged once per each period of oscillation of the multivibrator and supplies the load across output terminals 85 with a fraction of the supply voltage. Resistors 81 and 82 can be chosen to give any fraction of the supply voltage from zero volts to nearly full supply voltage. If output voltage is to be adjustable a potentiometer can be used instead of resistors 81 and 82.

FIG. 16 is a circuit diagram of same multivibrator as in FIG. 15 having only one resistor designated 88 instead resistors 81 and 82 and having auxiliary terminals designated 86 and 87 connected to respective collectors of transistors 74 and 80. Astable multivibrator is considered from now on as a switch in form of a block designated 89. Auxiliary terminals 87 and 86 are connected alternatively to the negative and to the positive input terminal as required for multiplication and polarity conversion.

In FIG. 17 input terminals are designated 73, switches 89, connection to switches (auxiliary terminals) designated 86 and 87, and a voltage doubling network connected to it and consisting of blocking diodes 90 and 92, charge transfer capacitor designated 91 and a storage capacitor designated 93 and connected across output terminals designated 94. Operation of the circuit is now obvious and needs no explanation.

FIG. 18 shows a diagram of a voltage tripler. Here a new blocking diode designated 95 and a new charge transfer capacitor designated 96 are added, as compared to the voltage doubler of FIG. 17, to allow storage capacitor designated 98 to be charged to approximately triple supply voltage. Further explanation is unnecessary.

In a similar way is formed a voltage quadrupler of FIG. 19 and a voltage quintupler of FIG. 20. Just one note to multipliers is: that the number of diodes (or capacitors) used for multiplication equals to the multiple by which the supply voltage is multiplied at the output terminals. A note to the polarity converters: the number of diodes less one (or capacitors less one) used for voltage multiplication and polarity conversion equals the multiple by which the supply voltage is multiplied at the output terminals.

FIG. 21 is a modified voltage tripler having multiple outputs. One output supplies battery voltage, second one double battery voltage, and the third one triple battery voltage. The circuit is a combination of FIGS. 17 and 18. Same can be applied to higher order multipliers.

FIG. 22 is a voltage scaler and polarity converter circuit. One hint to its operation: charge transfer capacitor designated 123 is charged to the supply voltage. When transistor designated 120 conducts potential across capacitor 123 is translated into negative direction, as resistors designated 121 and 122 dictate, storage capacitor designated 126 is charged to same amount of negative potential.

FIG. 23 shows a convenient switch used to develop multiples of the input voltage with reversed (converted) polarity.

FIG. 24 shows a polarity converter which needs no explanation.

FIG. 25 represents a polarity converter and voltage doubler, and

FIG. 26 representing a polarity converter and voltage tripler and need no explanation of operation.

FIG. 27 is a voltage quadrupler and polarity converter and finally,

FIG. 28 is a polarity converter which is a total complement to the circuit in FIG. 24, thus negative input voltage is converted into a positive output voltage.

To conclude: these circuits are representative circuits, useful for relatively small load currents. Many more modifications and variations of these circuits are possible, some to operate at heavy load currents some to include output voltage regulation, temperature compensation, short circuit protection, with outputs of combined polarities etc.

I claim:

1. A D-C voltage multiplier, regulator and filter circuit for converting a D-C pulsating input voltage into a regulated and filtered D-C output voltage of double magnitude and including a common terminal and an input terminal for receiving said input voltage, and an output terminal for delivering said output voltage to a load, and comprising:

a Zener diode (used as a reference voltage) and connected with its anode to said common terminal and with its cathode to a resistor having its other end connected to said input terminal and used to limit the current through said Zener diode, a p-n-p type transistor having emitter, base and collector electrodes, its emitter electrode being connected to said input terminal and its collector connected to a resistor having its remaining end connected to said common terminal and used to limit collector current, a base current limiting resistor connected between the interconnection of said Zener diode and said resistor, and the base of said transistor, first diode having its anode connected to said input terminal, and its cathode to the anode of a second diode having its cathode connected to said output terminal, a charge transfer capacitor connected to the interconnection of said collector and said resistor, and its remaining plate being connected to the interconnection of said first and said second diode, and a storage capacitor connected across said common and said output terminals used to store electrical charge at a multiple 2 of said input voltage and deliver it to a load.

2. A D-C voltage multiplier, regulator and filter circuit for converting a pulsating D-C input voltage into a regulated and filtered D-C output voltages of multiple magnitude and including a common and an input terminal to receive said input voltage, first output terminal to deliver said output voltage at multiple 1, second output terminal to deliver said output voltage at multiple 2, third output terminal to deliver said output voltage at multiple 3 and comprising:

a Zener diode as a reference voltage, its anode being connected to said common terminal and its cathode connected to a resistor having other end connected to said input terminal, first p-n-p transistor having emitter, base and collector electrodes and used as the first switch having its emitter electrode connected to said input terminal, while its collector is connected to the first collector resistor whose remaining end is connected to said common terminal, first base current limiting resistor connected to interconnection of said Zener diode and said resistor, and the base of said first transistor, a feedback capacitor connected between collector and base electrodes of said first transistor, a second p-n-p type transistor used as the second switch and having emitter, base and collector electrodes, emitter electrode being connected to said input terminal, while collector electrode is connected to a second collector current limiting resistor having second end connected to said common terminal, a second base current limiting resistor connected between the collector of said first transistor and the base of said second transistor, auxiliary terminal connected to collecteor of said first transistor, and used as the first shifting potential terminal, second auxiliary terminal connected to the collector of said second transistor, and used as the second shifting potential terminal, first diode having anode connected to said input terminal and its cathode connected to the anode of a second diode, whose cathode is connected to the anode of a third diode, whose cathode is connected to said third output terminal, first charge transfer capacitor connected to interconnection of said first and said second diode, and its remaining plate to said second auxiliary terminal, second charge transfer capacitor connected to the interconnection of said second and said third diode, and its other plate to said first auxiliary terminal, first blocking diode having its anode connected to said input terminal and its cathode to said first output terminal and first storage capacitor having its other plate connected to said common terminal, and used to store the electric charge at the multiple 1 of the input voltage, second blocking diode having anode connected to said interconnection of said first and said second diode and its cathode to said second output terminal and a second storage capacitor, having its remaining plate connected to said common terminal and used to store electric charge at the multiple 2 of said input voltage, and a third storage capacitor connected between said third output terminal and its remaining plate to said common terminal and used to store electric charge at the multiple 3 of said input voltage.

3. A D-C voltage multiplier, regulator and filter circuit for converting a pulsating D-C input voltage into a regulated, filtered quintupled D-C output voltage, including a common and an input terminal for receiving said input voltage and output terminal to deliver said output voltage to a load and comprising:

a Zener diode (as a reference voltage) having anode connected to said common terminal and its cathode connected to a resistor having remaining end connected to said input terminal, first p-n-p type transistor having emitter, base and collector electrodes and used as the first switch having its emitter electrode connected to said input terminal, while its collector is connected to the first collector resistor whose remaining end is connected to said common terminal, first base current limiting resistor connected to interconnection of said Zener diode and said resistor, and to the base of said first transistor, a feedback capacitor connected between collector and the base electrodes of said first transistor, a second p-n-p type transistor used as the second switch and having emitter, base and collector electrodes, emitter electrode being connected to said input terminal, while collector electrode is connected to a second collector current limiting resistor having remaining end connected to said common terminal, a second base current limiting resistor connected between the collector of said first transistor and the base of said second transistor, first auxiliary terminal connected to collector of said first transistor, and used as the first shifting potential terminal, second auxiliary terminal connected to the collector of said second transistor and used as the second shifting potential terminal, first diode having anode connected to said input terminal and its cathode connected to the anode of a second diode, whose cathode is connected to the anode of a third diode having cathode connected to the anode of a fourth diode having its cathode connected to the anode of a fifth diode whose cathode is connected to said output terminal, first charge transfer capacitor connected to interconnection of said first and said second diode and its remaining plate to said second auxiliary terminal, second charge transfer capacitor connected to interconnection of said second and said third diode and its other plate to the said first auxiliary terminal, third charge transfer capacitor connected to interconnection of said third and said fourth diode and its remaining plate to said second auxiliary terminal, fourth charge transfer capacitor connected to interconnection of said fourth and said fifth diode and its other plate connected to said first auxiliary terminal and a storage capacitor connected between said common and said output terminal and used to store electric charge at a multiple of 5 of the input voltage magnitude.

4. A D-C voltage multiplier, regulator, polarity converter and filter circuit for converting a pulsating D-C input voltage into a regulated, filtered and doubled D-C output voltage of opposite polarity, including a common and an input terminal for receiving said input voltage and an output terminal to deliver said output voltage to a load and comprising:

a Zener diode (used as a reference voltage) having its cathode connected to said input terminal and its anode to a resistor having remaining end connected to said common terminal, first n-p-n type transistor used as the first switch, and having emitter, base and collector electrodes, emitter electrode being connected to said common terminal, its collector connected to a first collector resistor having other end connected to said input terminal, first base current limiting resistor connected to the base of said first transistor and its remaining end to the interconnection of said Zener diode and said resistor, a feedback capacitor interconnected betwen collector and the base of said first transistor, second n-p-n type transistor, used as the second switch, and having emitter, base and collector electrodes, its emitter being connected to said common terminal, its collector to a second collector current limiting resistor having its other end connected to said input terminal, second base current limiting resistor connected to the base of said second transistor, and its other end to the collector of said first transistor, first diode having cathode connected to said common terminal and its anode to the cathode of a second diode having its anode connected to the cathode of a third diode having its anode connected to said output terminal, first charge transfer capacitor connected to interconnection of said first and said second diode, and its remaining plate connected to the collector of said first transistor, second charge transfer capacitor connected to the interconnection of said second and said third diode and having its second plate connected to the collector of said second transistor, and a storage capacitor connected between said common and said output terminal and used to store the electric charge of opposite polarity and at a multiple of 2 of the input voltage.

5. A D-C voltage multiplier and filter circuit for converting an input D-C voltage into a filtered D-C output voltage of multiple magnitude including a common and an input terminal for receiving said input voltage, first output terminal to deliver said input voltage as output voltage of multiple 1, second output terminal to deliver said output voltage of multiple 2, third output terminal to deliver said output voltage of multiple 3, and comprising:

first p-n-p transistor having emitter, base and collector electrodes, emitter electrode being connected to said input terminal, collector electrode connected to a resistor whose other end is connected to said common terminal, and a resistor connected between said base and said common terminal, a second p-n-p transistor having emitter, base and collector electrodes, emitter electrode being connected to said input terminal, collector electrode to a resistor having its other end connected to said common terminal, and a resistor connected between said base and said common terminal, first feedback capacitor connected between the collector of said first transistor and the base of said second transistor, second feedback capacitor connected between the collector of said second transistor and the base of said first transistor, first auxiliary terminal connected to collector of said second transistor and used as the first shifting potential terminal, second auxiliary terminal connected to collector of said first transistor and used as second shifting potential terminal, first diode having its anode connected to said input terminal and its cathode to the anode of a second diode having its cathode connected to anode of a third diode having its cathode connected to said third output terminal, first charge transfer capacitor connected to interconnection of said first and said second diode, and its remaining plate connected to said first auxiliary terminal, second charge transfer capacitor connected to the interconnection of said second and said third diode and its remaining plate to said second auxiliary terminal a blocking diode having anode connected to interconnection of said first and said second diode, and its cathode connected to said second output terminal and to the first storage capacitor having second plate connected to said common terminal, and used to store the electrical charge at a multiple of 2 of said input voltage, second storage capacitor connected between said common and said third output terminal, and serves to store electric charge at a multiple of 3 of the input voltage.

6. A D-C voltage multiplier, polarity converter and filter circuit for converting a D-C input voltage into a filtered doubled D-C output voltage of opposite polarity including a common and an input terminal for receiving said input voltage, and an output terminal to deliver said output voltage to a load and comprising:

first n-p-n transistor having emitter, base and collector electrodes, emitter electrode being connected to said common terminal, collector electrode connected to a resistor having its other end connected to said input terminal, a base current limiting resistor connected between the base of said transistor and the said input terminal, second n-p-n type transistor having emitter, base and collector electrodes and having its emitter connected to said common terminal, its collector to a resistor with its other end connected to said input terminal, and a base current limiting resistor connected between said base and said input terminal, first feedback capacitor connected between the collector of said first transistor and the base of said second transistor, second feedback capacitor connected between the collector of said second transistor and the base of said first transistor, first auxiliary terminal connected to the collector of said second transistor, second auxiliary terminal connected to the collector of said first transistor, first diode having cathode connected to said common terminal and its anode connected to the cathode of a second diode having its anode connected to the cathode of a third diode having its anode connected to said output terminal, first charge transfer capacitor connected to interconnection of said first and said second diode and its remaining plate to said first auxiliary terminal, second charge transfer capacitor connected to interconnection of said second and said third diode and its other plate to said secondary auxiliary terminal, and a storage capacitor connected between said common and said output terminals, and used to store electric charge at a multiple of 2 and of opposite polarity to the input voltage.

* * * * *